United States Patent [19]

Oldakowski

[11] Patent Number: 5,121,018
[45] Date of Patent: Jun. 9, 1992

[54] LATCHING BRAKE USING PERMANENT MAGNET

[75] Inventor: Stephen Z. Oldakowski, Bedford, Ohio

[73] Assignee: Lucas Aerospace Power Equipment Corporation, Aurora, Ohio

[21] Appl. No.: 663,478

[22] Filed: Mar. 4, 1991

[51] Int. Cl.⁵ .................. H02K 7/106; B60T 13/04; H01F 7/18; H01H 9/20
[52] U.S. Cl. .................................. 310/77; 188/161; 335/179
[58] Field of Search ............... 188/161, 163; 310/77; 335/177, 179

[56] References Cited

U.S. PATENT DOCUMENTS

| | | | |
|---|---|---|---|
| 3,512,618 | 5/1970 | Schäfer | 188/161 |
| 3,534,307 | 10/1970 | Spewock et al. | 310/77 |
| 3,763,968 | 10/1973 | Noly | 310/77 |
| 4,237,439 | 12/1980 | Nemoto | 335/179 |
| 4,855,699 | 8/1989 | Hoegh | 310/77 |
| 4,999,530 | 3/1991 | Azuma et al. | 310/77 |
| 5,057,728 | 10/1991 | Dammeyer et al. | 310/77 |

Primary Examiner—Steven L. Stephan
Assistant Examiner—D. L. Rebsch
Attorney, Agent, or Firm—Pearne, Gordon, McCoy & Granger

[57] ABSTRACT

A magnetic brake provides braking or locking capability and is remotely controlled by electric power. The magnetic brake comprises a rotatable shaft and a brake disc mounted on the shaft. A non-rotating core housing assembly located around the shaft includes a permanent magnet and a bipolar solenoid. A magnetic armature adjacent to the core housing assembly is capable of movement toward the core housing assembly and toward and into engagement with a brake disc to prevent rotation of the shaft. A spring urges the armature away from the core housing assembly and into engagement with the brake disc. The brake does not use any electric power to maintain the brake in the set mode with the rotating shaft fully locked, or in the released mode with the rotating shaft fully released. The permanent magnet is of sufficient strength to hold the armature against urging of the spring until an opposite polarity is supplied by the solenoid.

16 Claims, 3 Drawing Sheets

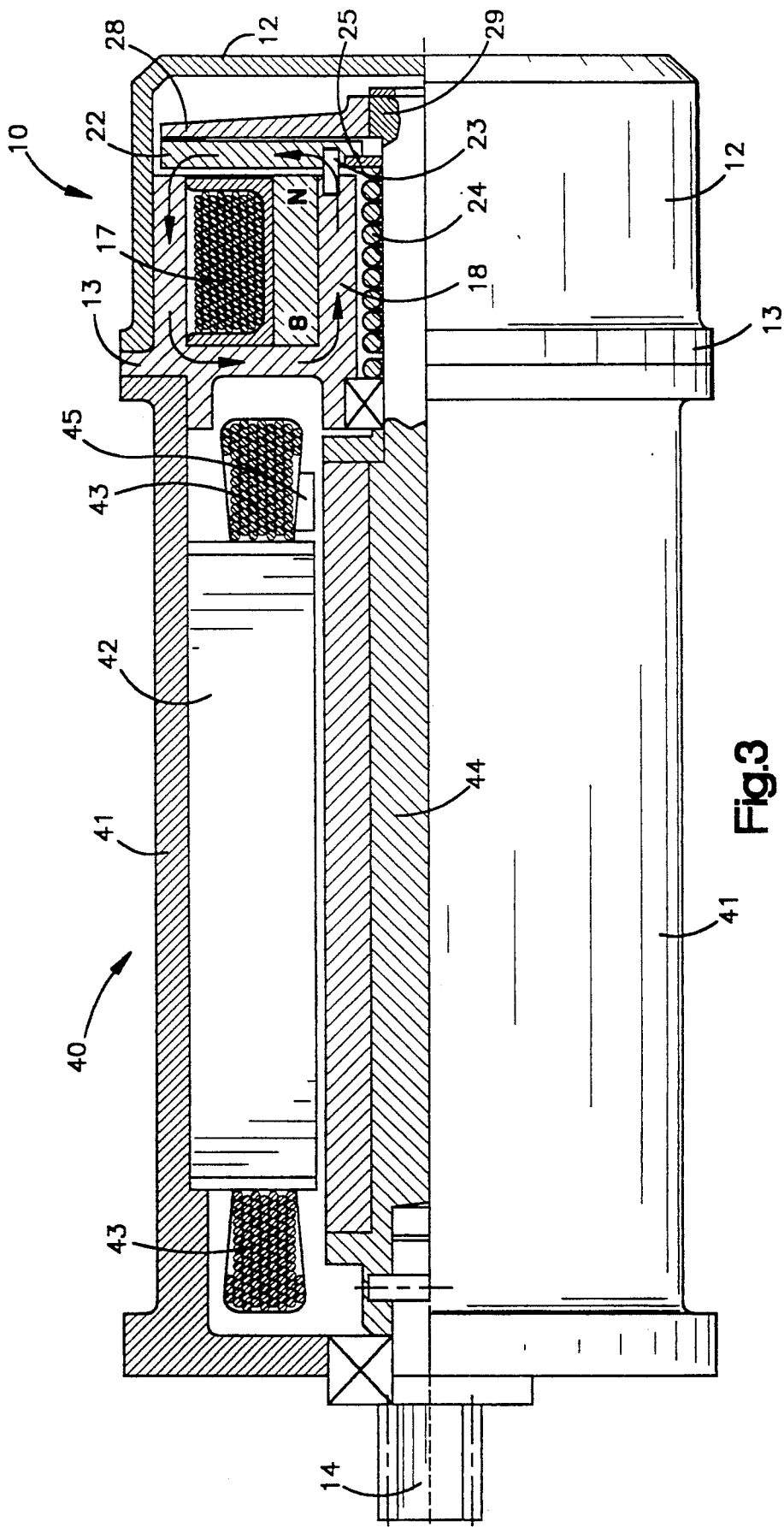

LATCHING BRAKE USING PERMANENT MAGNET

BACKGROUND OF THE INVENTION

1. Field of the Invention

This invention relates to actuatable brakes for rotating shafts, and more particularly to a brake which uses a magnet for actuation.

2. Description of the Prior Art

In the use of various mechanisms such as electric motors, it is sometimes necessary to set and hold the position of a rotating shaft. For this purpose, a brake is typically used to hold the shaft in position. In applications in which the brake is at a remote location, the brake is often remotely controlled, so that the rotating shaft can be locked in position and released from a location faraway from the location of the brake. The remote control mechanism may be electrically powered, such that an electrically powered device at the brake location is used to set and release the brake, and this electrically powered device is controlled from the remote location.

In certain applications, such as in aerospace applications on missiles and in similar applications, the on-board power is very limited. Therefore, an electrically powered device for setting and releasing the brake must use a minimal amount of power, and preferably uses no power at all to keep the shaft locked in position after the brake has been set, and to maintain the shaft in an unlocked configuration after the brake has been released.

SUMMARY OF THE INVENTION

The present invention overcomes the problems of the prior art and provides advantages heretofore not obtained. The present invention provides a magnetic brake that provides braking or locking capability and is remotely controlled by electric power. The brake of the present invention provides a unique locking mechanism, in which no electric power is used to maintain the brake in the set mode with the rotating shaft fully locked, or to maintain the brake in the released mode with the rotating shaft fully released.

The magnetic lock of the present invention is specially adaptable for use with an electric motor, such that the output shaft of the motor can be locked or released by setting or releasing the brake. However, the magnetic brake of the present invention is also self contained and can be used independently as a part of any mechanical drive system.

These and other advantages are achieved by the present invention of a magnetic brake which comprises a rotatable shaft and brake means mounted on the shaft. A non-rotating core housing assembly is located around the shaft. The core housing assembly includes a permanent magnet and bipolar solenoid means. A magnetic armature adjacent to the core housing assembly is capable of movement toward the core housing assembly and toward and into engagement with the brake means to prevent rotation of the shaft. There are means for urging the armature away from the core housing assembly and into engagement with the brake means.

In accordance with another aspect of the present invention, a motor is provided, comprising a stator, a rotor having a rotatable shaft attached thereto and brake means for releasably locking the shaft in position. The brake means comprises a brake disc mounted on the shaft, a non-rotating core housing assembly located around the shaft, the core housing assembly, including a permanent magnet and bipolar solenoid means, a magnetic armature adjacent to the core housing assembly and capable of movement toward the core housing assembly and toward and into engagement with the brake disc to prevent rotation of the shaft, and means for urging the armature away from the core housing assembly and into engagement with the brake disc.

BRIEF DESCRIPTION OF THE DRAWINGS

FIG. 3 is a side sectional view showing the brake of FIGS. 1 and 2 incorporated into an electric motor.

DETAILED DESCRIPTION OF THE PREFERRED EMBODIMENT

Figure 1:
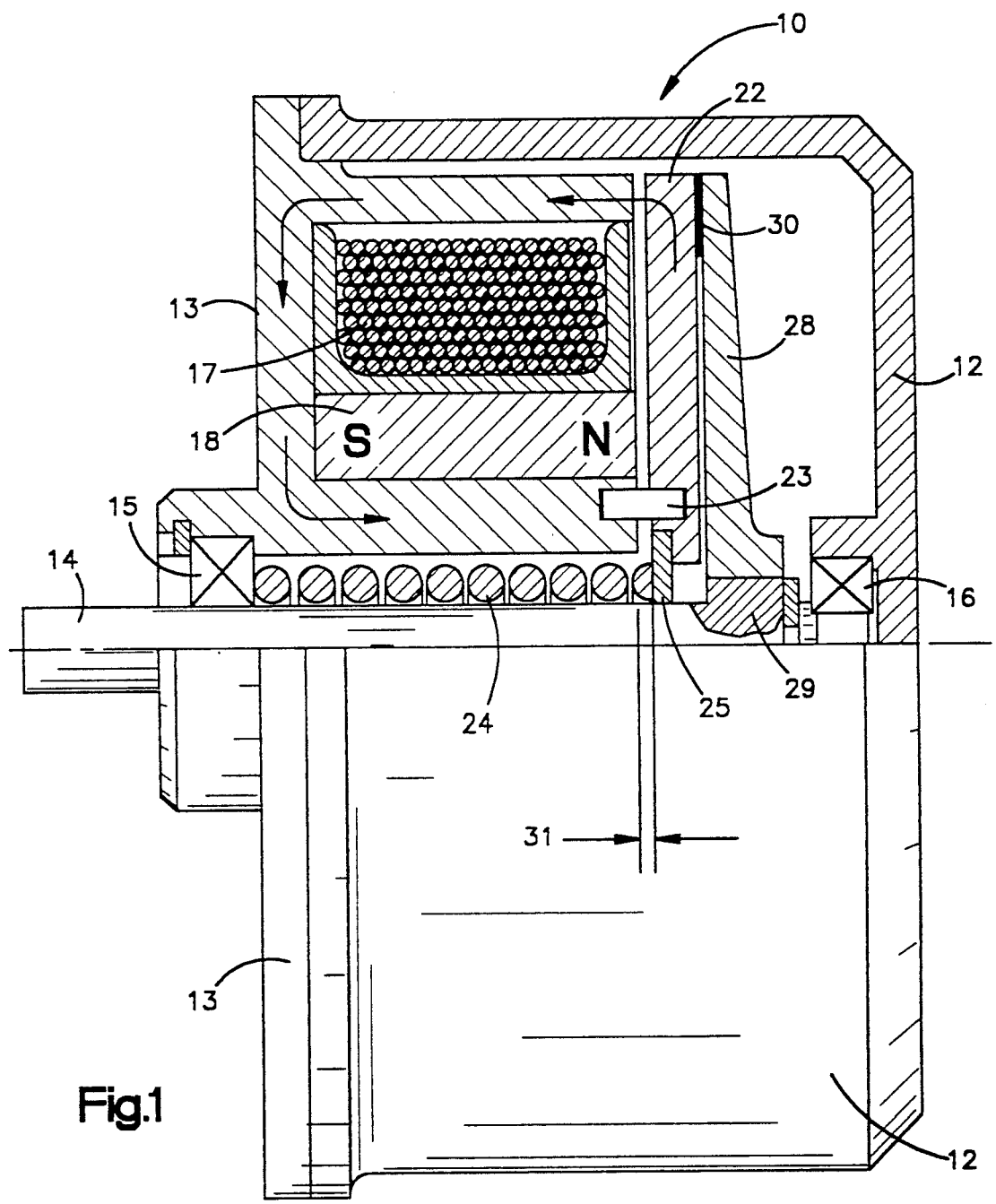
FIG. 1 is a side sectional view of the brake of the present invention in the engaged position.
Figure 2:
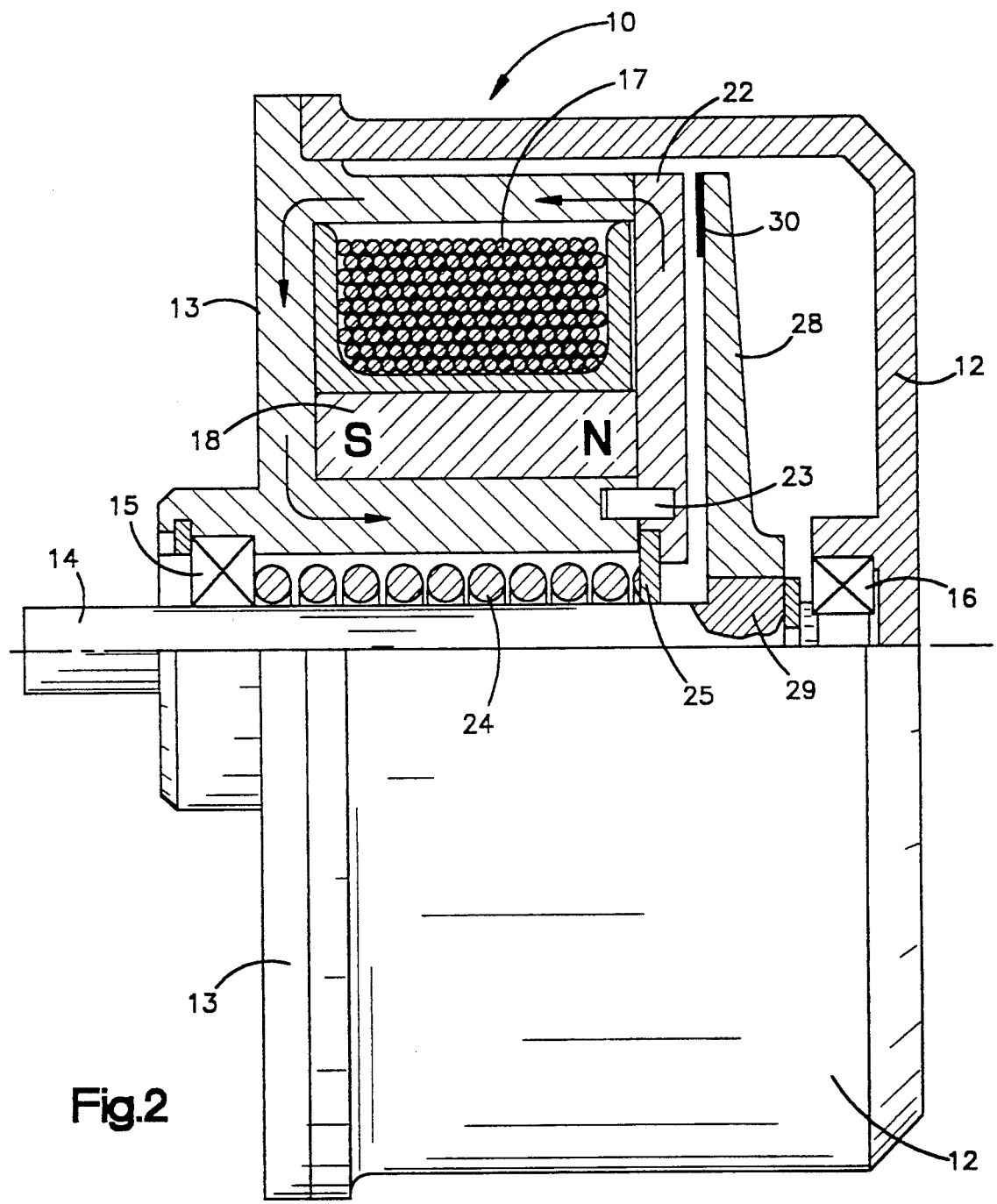
FIG. 2 is a side sectional view similar to FIG. 1, showing the brake of the present invention in the disengaged position.

Referring more particularly to the drawings and initially to FIGS. 1 and 2, there is shown a brake 10 in accordance with the present invention.

The brake 10 includes an outer housing 12 and an inner magnetic core housing 13. The core housing 13 is formed of a low carbon steel. The core housing 13 is mounted on one end of the outer housing 12 to form a housing assembly through which a shaft 14 is mounted for rotation by means of bearings 15 and 16. A bi-polar solenoid 17 and a two-pole permanent magnet 18 are contained in the core housing 13 to form a core housing assembly, with the housing 13 serving as a magnetic core. The solenoid 17 is capable of being energized in either of two polarities depending upon the direction of the current flowing to the solenoid, so that the solenoid is energized either in a polarity that is the same as that of the permanent magnet 18 or in a polarity that is opposite that of the permanent magnet.

A magnetic armature disc 22 is attached to the core housing 13 by means of a pin 23 which prevents the armature disc from rotating, but allows the armature disc to move axially with respect to the core housing. The magnetic armature disc 22 is polarized such that opposite poles are presented at the juxtaposed portions of the armature disc 22 and the permanent magnet 18 whereby the armature disc is magnetically attracted to the permanent magnet. The armature disc 22 is urged axially away from the permanent magnet 18 and the core housing 13 by a compression spring 24 mounted around the shaft 14 between the bearings 15 and a non-magnetic rotatable insert 25 mounted around the shaft and which engages the inner portion of the armature disc 22. Both the magnetic core housing 13 and the armature disc 22 form a magnetic path for the flux to flow around the solenoid 17 and the permanent magnet 18.

A brake disc 28 is located adjacent to the armature disc 22 and limits the axial movement of the armature disc 22 away from the core housing 13. The brake disc 28 has a brake lining pad 30 on one side for engaging the armature disc 22 when the armature disc is moved into engagement with the brake disc. The brake disk 28 has a central opening by which the brake disc is mounted on the shaft 14. A key 29 projects from the shaft 14 at the location of the brake disc 28, and the key 29 fits within a corresponding keyed slot in the central opening of the brake disc, so that the brake disc 28 is attached to the shaft 14 to rotate with the shaft.

The armature disc 22 is thus axially movable between two positions: an engaged position in which the brake 10 inhibits rotation of the shaft 14, and a disengaged position in which the shaft is free to rotate.

The armature disc 22 is in the engaged position when it is urged by the spring 24 away from the core housing 13 and into engagement with the rotatable brake disc 28 which is, in turn, attached to the shaft 14. In this position, as shown in FIG. 1, a magnetic gap 31 is created between the core housing 13 and the armature disc 22. This gap 31 interrupts the flux around the permanent magnet 18, and the magnetic attraction of the magnet 18 is insufficient to overcome the force exerted by the spring 24 which forces the armature disc 22 away from the core housing 13.

The armature disc 22 is in the disengaged position when it is held by the magnetic attraction of the permanent magnet 18 into engagement with the core housing 13 as shown in FIG. 2. In this position, the magnetic attraction between the armature disc 22 and the permanent magnet 18 is sufficient to overcome the repulsive force of the spring 24.

The solenoid 17 can be energized in either of two polarities so that either the solenoid has the same polarity as the permanent magnet 18 or the solenoid has the polarity opposite from the permanent magnet. When the solenoid 17 is energized in the same polarity as the permanent magnet 18, the solenoid increases the magnetic flux through the core housing 13 and exerts an attraction upon the armature disc 22 that is strong enough to overcome the force of the compression spring 24. When the solenoid 17 is energized in the polarity opposite from the permanent magnet 18, it exerts a repulsive force on the armature disc 22, causing the armature disc to be forced away from the core housing 13 and opening the magnetic gap 31.

When the solenoid 17 is de-energized either armature disc 22 is retained by the spring 24 against the brake disc 28 which results in the locked condition of the shaft 14 or the armature disc 22 is retained by the permanent magnet 18 which results in the brake 10 being released and the shaft allowed to rotate. Energizing the solenoid 17, depending upon the polarity of the current, either releases the brake 10 allowing the shaft 14 to rotate, or resets the brake.

The operation of the brake of the present invention can be understood with reference to FIGS. 1 and 2. With the brake 10 in the engaged or set position as shown in FIG. 1, the armature disc 22 is urged away from the core housing 13 by the spring 24, which pushes the armature disc against the brake disc 28. Since the brake disc 28 is keyed to rotate with the shaft 14, the shaft is locked against rotation by the engagement of the armature disc 22 with the brake disc 28.

To release the brake 10, the solenoid 17 is energized in the same polarity as the permanent magnet 18. The energizing of the solenoid 17 increases the flux in the core housing 13 and increases the magnetic force exhibited on the armature disc 22, causing the armature disc 22 to move axially toward the core housing 13 and away from the brake disc 28. As the armature disc 22 moves toward the core housing 13, the spring 24 is compressed, and the brake disc 28 is released from engagement by the armature disc, so that the brake disc and the attached shaft 14 are free to rotate. The armature disc 22 is drawn toward the core housing 13 until it engages the core housing and the permanent magnet 18. When the solenoid 17 is de-energized, the magnetic force exhibited by the permanent magnet 18 is sufficient to hold the armature disc 22 against the core housing 13 without the assistance of the solenoid and without the need for continued electrical power, so that the armature disc 22 remains in the unlocked or released position, as shown in FIG. 2, with the armature disc 22 against the core housing 13 and the spring 24 compressed.

To set the brake 10, the solenoid 17 is energized in the opposite polarity from the permanent magnet 18. The energizing of the solenoid 17 decreases or reverses the flux in the core housing 13, decreasing the magnetic attraction between the core housing and the armature disc 22 or repelling the armature disc from the core housing. The armature disc 22 thus moves axially away from the core housing 13, assisted by the force of the spring 24 which urges the armature disc away from the core housing. The armature disc 22 is pushed by the spring 24 into engagement with the brake disc 28. Since the brake disc 28 is fixed to the rotating shaft 14, the shaft is locked against further rotation. When the solenoid 17 is de-energized, the force of the spring 24 maintains the armature disc 22 in engagement with the brake disc 28 without the need for further electrical power, so that the brake 10 remains in the engaged or set position.

FIG. 3 shows the brake 10 of the present invention incorporated into an electric motor 40. A d.c. brushless motor 40 is shown such as would be used as a servo motor in aerospace applications. As shown in FIG. 3, the outer housing 12 and the inner magnetic core housing 13 are attached to a motor housing 41 to form a housing assembly. A stator 42 having windings 43 and a Hall effect sensor 45 is contained within the motor housing 41. A rotor 44 is attached to the shaft 14 as part of the motor assembly.

The brake 10 can be used in association with the motor 40 to maintain the shaft in a set or locked position when the motor is not operating. For example, the brake 10 can be maintained in the engaged position, with the armature disc 22 in engagement with the brake disc 28, when the motor 40 is not operating. When it is desired to use the motor 40 to rotate the shaft 14, the brake solenoid 17 can be energized at the same time that the motor 40 is actuated, with the solenoid 17 energized in the same polarity as the permanent magnet 18, to cause the armature disc 22 to move axially toward the core housing 13 and release engagement with the brake disc 28, so that the shaft 14 is released from the brake 10. The motor 40 would then take control of the shaft 14 to rotate the shaft as desired. When the desired shaft rotation is complete, the motor 40 is turned off, and, at the same time, the brake solenoid 17 is energized in the polarity opposite that of the permanent magnet 18 to decrease or reverse the flux through the core housing 13 and allow the armature disc 22 to move axially away from the core housing 13, so that the spring 24 forces the armature disc 22 into engagement with the brake disc 28 to lock the brake disc and the attached shaft 14 against further rotation.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way this is inconsistent with the extent to which the progress in the art has been advance by the invention.

What is claimed is:

1. A magnetic brake, comprising:
   a rotatable shaft;
   brake means mounted on the shaft;
   a non-rotating core housing assembly located around the shaft, the core housing assembly including
   a permanent magnet and
   bipolar solenoid means adjacent to the permanent magnet, the permanent magnet continually producing a magnetic field around the solenoid means;
   a magnetic armature adjacent to the core housing assembly and capable of movement toward the core housing assembly and toward and into engagement with the brake means to prevent rotation of the shaft; and
   means for urging the armature away from the core housing assembly and into engagement with the brake means.

2. A magnetic brake as defined in claim 1, wherein the permanent magnet is capable of holding the magnetic armature toward the core housing in opposition to the urging means.

3. A magnetic brake as defined in claim 1, wherein the solenoid means moves the armature toward and away from the core housing assembly.

4. A magnetic brake as defined in claim 1, wherein the urging means comprises a spring which pushes the armature away from the core housing assembly.

5. A magnetic brake, comprising:
   a rotatable shaft;
   a brake disc fixedly mounted on the shaft;
   a non-rotating core housing located around the shaft;
   a magnetic armature adjacent to the core housing and capable of movement toward the core housing and toward and into engagement with the brake disc to prevent rotation of the shaft;
   means for urging the armature away from the core housing and into engagement with the brake disc;
   a permanent magnet within the core housing, the permanent magnet capable of holding the magnetic armature toward the core housing in opposition to the urging means; and
   bipolar solenoid means adjacent to the permanent magnet in the core housing, the permanent magnet continually producing a magnetic field around the solenoid means, the solenoid means moving the armature toward and away from the core.

6. A magnetic brake as defined in claim 5, wherein the urging means is capable of holding the armature in engagement with the brake disc in opposition to the permanent magnet.

7. A magnetic brake as defined in claim 5, wherein the solenoid means is capable of being energized in a first polarity to move the armature toward the core housing in opposition to the urging means and capable of being energized in a second polarity to move the armature away from the core housing in opposition to the permanent magnet.

8. A magnetic brake as defined in claim 5, wherein the permanent magnet creates magnetic flux which flows through the core housing.

9. A magnetic brake as defined in claim 8, wherein the flux flows through the armature when the armature is moved into position towards the core housing.

10. A magnetic brake as defined in claim 8, wherein a magnetic gap is created between the armature and the core housing when the armature is moved into engagement with the brake disc.

11. A magnetic brake as defined in claim 10, wherein the magnetic gap interrupts the flow of flux flowing created by the permanent magnet.

12. A magnetic brake, comprising:
    an outer housing;
    a rotatable shaft mounted for rotation within the outer housing and having an end extending from the outer housing;
    a brake disc fixedly mounted on the shaft within the outer housing, the brake disc rotating with the shaft;
    a non-rotating core housing attached to the outer housing, the core housing extending around the shaft;
    a magnetic armature disc adjacent to the core housing and capable of movement toward the core housing and toward and into engagement with the brake disc to prevent rotation of the shaft;
    spring means for urging the armature disc away from the core housing and into engagement with the brake disc;
    a permanent magnet within the core housing, the permanent magnet capable of holding the magnetic armature disc in engagement with the core housing in opposition to the urging means, the urging means capable of holding the armature disc in engagement with the brake disc in opposition to the permanent magnet; and
    bipolar solenoid means adjacent to the permanent magnet in the core housing, the permanent magnet continually producing a magnetic field around the solenoid means, the solenoid means capable of being energized in a first polarity to move the armature disc toward the core housing in opposition to the spring means and capable of being energized in a second polarity to move the armature disc away from the core housing in opposition to the permanent magnet.

13. An electric motor, comprising:
    a stator;
    a rotor having a rotatable shaft attached thereto; and
    brake means for releasably locking the shaft in position, the brake means comprising
    a brake disc mounted on the shaft;
    a non-rotating core housing assembly located around the shaft, the core housing assembly, including
    a permanent magnet and
    bipolar solenoid means adjacent to the permanent magnet, the permanent magnet continually producing a magnetic field around the solenoid means;
    a magnetic armature adjacent to the core housing assembly and capable of movement toward the core housing assembly and toward and into engagement with the brake disc to prevent rotation of the shaft; and
    means for urging the armature away from the core housing assembly and into engagement with the brake disc.

14. An electric motor as defined in claim 13, wherein the permanent magnet is capable of holding the magnetic armature toward the core housing in opposition to the urging means.

15. An electric motor as defined in claim 13, wherein the solenoid means moves the armature toward and away from the core housing assembly.

16. An electric motor as defined in claim 13, wherein the urging means comprises a spring which pushes to armature away from the core housing assembly.

* * * * *